US012580256B2

(12) United States Patent　　(10) Patent No.:　US 12,580,256 B2
Langley et al.　　　　　　　　　　(45) Date of Patent:　　Mar. 17, 2026

(54) TRACTION BATTERY PACKS WITH MIXED MATERIAL TRAY STRUCTURES

(71) Applicant: FORD GLOBAL TECHNOLOGIES, LLC, Dearborn, MI (US)

(72) Inventors: Derek Langley, Dearborn, MI (US); Vladimir Vladimirovich Bogachuk, West Bloomfield, MI (US); Shawn Michael Morgans, Chelsea, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 829 days.

(21) Appl. No.: 17/825,181

(22) Filed: May 26, 2022

(65) Prior Publication Data

US 2023/0387526 A1　　Nov. 30, 2023

(51) Int. Cl.
H01M 50/204　　(2021.01)
B60L 50/64　　(2019.01)
B60L 58/26　　(2019.01)
H01M 10/613　　(2014.01)
H01M 10/625　　(2014.01)
(Continued)

(52) U.S. Cl.
CPC ........... H01M 50/204 (2021.01); B60L 50/64 (2019.02); B60L 58/26 (2019.02); H01M 10/613 (2015.04); H01M 10/625 (2015.04); H01M 10/6554 (2015.04); H01M 10/6556 (2015.04); H01M 10/6568 (2015.04); H01M 50/224 (2021.01);
(Continued)

(58) Field of Classification Search
CPC ............. H01M 50/204; H01M 10/613; H01M 10/625; H01M 10/6556; H01M 50/244; H01M 10/647; H01M 50/209; H01M 10/653; H01M 50/289; B60L 50/64; B60L 58/26
USPC .......................................................... 429/99
See application file for complete search history.

(56) References Cited

U.S. PATENT DOCUMENTS

2014/0193683 A1 * 7/2014 Mardall .................... B60K 1/04
429/99
2015/0171486 A1 * 6/2015 Rawlinson .......... H01M 50/249
324/426
(Continued)

FOREIGN PATENT DOCUMENTS

CN　　　113629334 A　　11/2021
CN　　　215008474 U　　12/2021
(Continued)

*Primary Examiner* — Nicholas A Smith
*Assistant Examiner* — Kevin Nguyen
(74) *Attorney, Agent, or Firm* — David B. Kelley; Carlson, Gaskey & Olds, P.C.

(57)　　　　　　　ABSTRACT

Exemplary traction battery pack designs are disclosed for use in electrified vehicles. An exemplary traction battery pack may include an outer enclosure assembly that may house one or more battery arrays and/or other battery internal components. The outer enclosure assembly may include a tray having a mixed material or "hybrid" structure that provides a space efficient design. The tray may include a first subassembly made of a first material and a second subassembly made of a second, different material. The first subassembly may include a tub, and the second subassembly may include a heat exchanger plate. Central and perimeter joint strategies may be employed for securing the second subassembly relative to the first subassembly to provide the space efficient design.

19 Claims, 10 Drawing Sheets

(51) Int. Cl.
    *H01M 10/6554*     (2014.01)
    *H01M 10/6556*     (2014.01)
    *H01M 10/6568*     (2014.01)
    *H01M 50/224*     (2021.01)
    *H01M 50/244*     (2021.01)
    *H01M 50/249*     (2021.01)

(52) U.S. Cl.
    CPC ....... *H01M 50/244* (2021.01); *H01M 50/249*
        (2021.01); *H01M 2220/20* (2013.01)

(56)             References Cited

U.S. PATENT DOCUMENTS

| | | | |
|---|---|---|---|
| 2019/0109357 A1 * | 4/2019 | Kenney | F28F 21/00 |
| 2019/0131674 A1 * | 5/2019 | Lu | H01M 10/6568 |
| 2020/0398652 A1 * | 12/2020 | Stephens | B62D 25/025 |

FOREIGN PATENT DOCUMENTS

| | | | |
|---|---|---|---|
| CN | 215342756 U | 12/2021 | |
| KR | 20200080470 A1 * | 7/2020 | |
| KR | 102146171 B1 | 8/2020 | |
| WO | 202104637 A1 | 3/2021 | |

* cited by examiner

TRACTION BATTERY PACKS WITH MIXED MATERIAL TRAY STRUCTURES

TECHNICAL FIELD

This disclosure relates generally to electrified vehicle traction battery packs, and more particularly to traction battery pack enclosure assemblies that include mixed material tray structures for providing space efficient designs.

BACKGROUND

Electrified vehicles are designed to reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage traction battery pack typically powers the electric machines and other electrical loads of the electrified vehicle. The traction battery pack includes a plurality of battery cells and various other battery internal components that are housed within an outer enclosure assembly for supporting the electric propulsion of electrified vehicles.

SUMMARY

A traction battery pack according to an exemplary aspect of the present disclosure includes, among other things, an outer enclosure assembly including a tray, and a battery array housed inside the enclosure assembly. The tray includes a mixed material structure including a first subassembly and a second subassembly. The first subassembly includes a tub constructed from a first material, and the second subassembly includes a heat exchanger plate receivable within the tub and constructed of a second material that is different than the first material.

In a further non-limiting embodiment of the foregoing traction battery pack, the outer enclosure assembly includes a cover secured to the tray.

In a further non-limiting embodiment of either of the foregoing traction battery packs, the first material includes steel and the second material includes aluminum.

In a further non-limiting embodiment of any of the foregoing traction battery packs, the first subassembly further includes a pair of side rails, a pair of doubler plates, one or more cross rails, one or more center support brackets, and one or more bulkheads secured to the tub and each being made of the first material.

In a further non-limiting embodiment of any of the foregoing traction battery packs, the first subassembly further includes a pair of inner side reinforcement rails, a plurality of inner side reinforcement panels, a pair of doubler plates, a pair of outer side reinforcement rails, a plurality of outer side reinforcement panels, and a center support bracket secured to the tub and each being made of the first material.

In a further non-limiting embodiment of any of the foregoing traction battery packs, the second subassembly further includes a plurality of cross members secured to the heat exchanger plate and each being made of the second material.

In a further non-limiting embodiment of any of the foregoing traction battery packs, the second subassembly further includes a plurality of mounting brackets secured to the plurality of cross members.

In a further non-limiting embodiment of any of the foregoing traction battery packs, the heat exchanger plate includes an inlet, an outlet, and an internal cooling circuit including a plurality of interconnected coolant channels.

In a further non-limiting embodiment of any of the foregoing traction battery packs, the heat exchanger plate is elevated above a floor of the tub by at least one center support bracket.

In a further non-limiting embodiment of any of the foregoing traction battery packs, a foam support is situated between the floor and the heat exchanger plate.

In a further non-limiting embodiment of any of the foregoing traction battery packs, the at least one center support bracket establishes a center joint strategy for joining the second subassembly to the first subassembly along a longitudinal centerline axis of the tub.

In a further non-limiting embodiment of any of the foregoing traction battery packs, the second subassembly is secured to the first subassembly by a plurality of bulkheads that establish a perimeter joint strategy for joining the second subassembly to the first subassembly.

In a further non-limiting embodiment of any of the foregoing traction battery packs, a perimeter of the second subassembly is secured to an inner side reinforcement rail and an inner side reinforcement panel of the first subassembly.

In a further non-limiting embodiment of any of the foregoing traction battery packs, the inner side reinforcement rail and the inner side reinforcement panel are secured to a side wall of the tub.

In a further non-limiting embodiment of any of the foregoing traction battery packs, the second subassembly is secured to the first subassembly near a mid-span of the tub by a single center support bracket of the first subassembly.

A method for assembling a traction battery pack according to another exemplary aspect of the present disclosure includes, among other things, assembling or receiving a first subassembly of a tray of an enclosure assembly of the traction battery pack. The first subassembly includes a tub. The method further includes assembling or receiving a second subassembly of the tray. The second subassembly includes a heat exchanger plate. The method further includes positioning the second subassembly within the tub of the first subassembly, fastening the second subassembly to the first subassembly to form the tray, and positioning a battery internal component within an interior region of the tray.

In a further non-limiting embodiment of the foregoing method, fastening the second subassembly includes performing a central joint strategy and a perimeter joint strategy.

In a further non-limiting embodiment of either of the foregoing methods, performing the central joint strategy includes securing the heat exchanger plate to a center support bracket of the first subassembly.

In a further non-limiting embodiment of any of the foregoing methods, performing the perimeter joint strategy includes securing a cross rail of the second subassembly to a bulkhead or an inner side reinforcement rail of the first subassembly.

In a further non-limiting embodiment of any of the foregoing methods, the first subassembly includes subcomponents constructed from a first material and the second subassembly includes subcomponents constructed from a second material that is different than the first material.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack designs for use in electrified vehicles. An exemplary traction battery pack may include an outer enclosure assembly that may house one or more battery arrays and/or other battery internal components. The outer enclosure assembly may include a tray having a mixed material or "hybrid" structure that provides a space efficient design. The tray may include a first subassembly made of a first material and a second subassembly made of a second, different material. The first subassembly may include a tub, and the second subassembly may include a heat exchanger plate. Central and perimeter joint strategies may be employed for securing the second subassembly relative to the first subassembly to provide the space efficient design. These and other features are discussed in greater detail in the following paragraphs of this detailed description.

Figure 1:
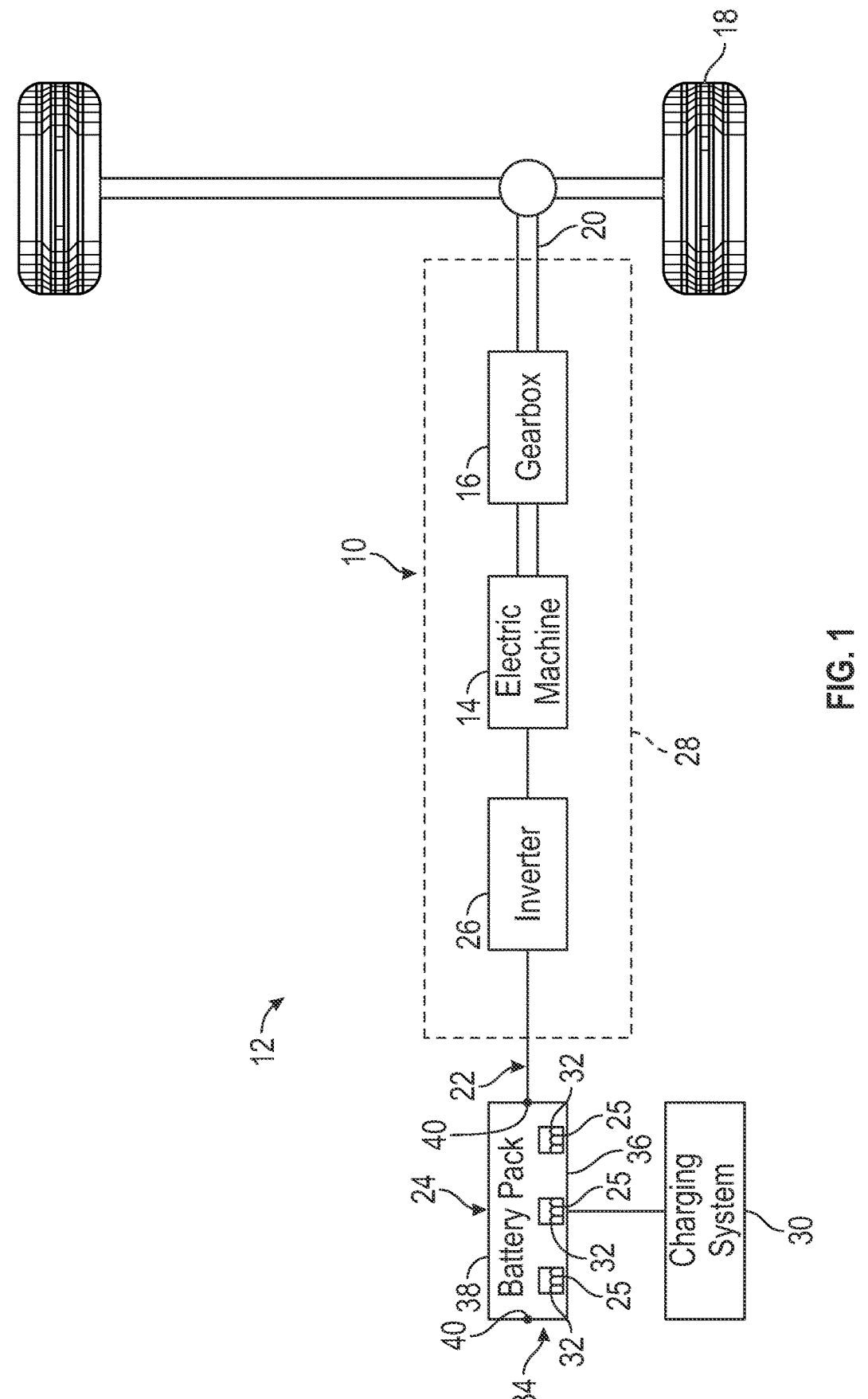
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other types of electrified vehicles, including, but not limited to, hybrid electric vehicles (HEVs), plug-in hybrid electric vehicles (PHEVs), fuel cell vehicles, etc. Thus, although not shown in this exemplary embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power from a traction battery pack 24 and provides a rotational output torque. The electric machine 14 may be connected to a gearbox 16 for adjusting the output torque and speed of the electric machine 14 by a predetermined gear ratio. The gearbox 16 is connected to a set of drive wheels 18 by an output shaft 20.

A voltage bus 22 electrically connects the electric machine 14 to the traction battery pack 24 through an inverter 26, which can also be referred to as an inverter system controller (ISC). The electric machine 14, the gearbox 16, and the inverter 26 may be collectively referred to as a transmission 28 of the electrified vehicle 12.

The traction battery pack 24 is an exemplary electrified vehicle battery. The traction battery pack 24 may be a high voltage traction battery pack that includes one or more battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The one or more battery arrays 25 of the traction battery pack 24 may include a plurality of battery cells 32 that store energy for powering various electrical loads of the electrified vehicle 12. The traction battery pack 24 could employ any number of battery cells 32 within the scope of this disclosure. Accordingly, this disclosure should not be limited to the exact configuration shown in FIG. 1.

In an embodiment, the battery cells 32 are lithium-ion cells. However, other cell chemistries (nickel-metal hydride, lead-acid, etc.) could alternatively be utilized within the scope of this disclosure.

In another embodiment, the battery cells 32 are cylindrical, prismatic, or pouch battery cells. However, other cell geometries could alternatively be utilized within the scope of this disclosure.

An outer enclosure assembly 34 may house the battery arrays 25 and other battery internal components of the traction battery pack 24. The outer enclosure assembly 34 may establish the outermost surfaces of the traction battery pack 24 and could embody any size, shape, and configuration within the scope of this disclosure.

The outer enclosure assembly 34 of the traction battery pack 24 may be a sealed enclosure that includes a tray 36, a cover 38, and a seal 40. The seal 40 may be disposed between the tray 36 and the cover 38 for sealing an interface therebetween. The seal 40 may be a press-in-place seal, a foam seal, a curable seal, or any other type of seal suitable for sealing the enclosure assembly 34.

The electrified vehicle 12 may also include a charging system 30 for charging the energy storage devices (e.g., the battery cells 32) of the traction battery pack 24. The charging system 30 may include charging components that are located both onboard the electrified vehicle 12 (e.g., vehicle charge port assembly, etc.) and external to the electrified vehicle 12 (e.g., electric vehicle supply equipment (EVSE), etc.). The charging system 30 can be connected to an external power source (e.g., a grid power source) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 of the electrified vehicle 12 within the scope of this disclosure.

There may be a limited amount of space available on the electrified vehicle 12 for accommodating the traction battery pack 24. Further, there is a desire to reduce the expenses associated with manufacturing the traction battery pack 24. This disclosure is therefore directed to battery outer enclosure tray structures that provide, among other benefits, space efficient designs that are less expensive to manufacture and assemble compared to prior designs.

Figures 2, 3:
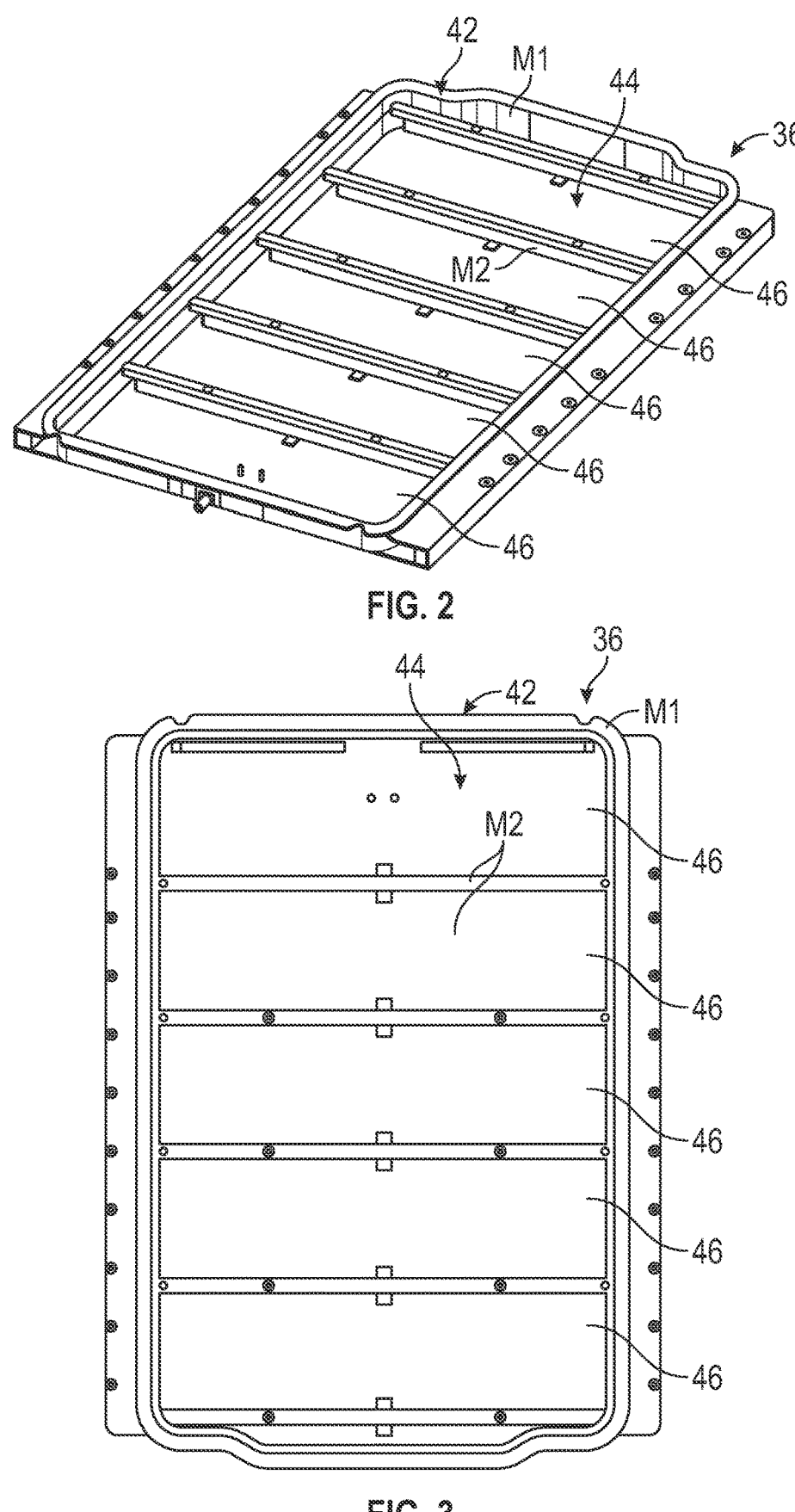
FIG. 2 is an isometric view of a tray of an outer enclosure assembly for a traction battery pack.
FIG. 3 is a top view of the tray of FIG. 2.
Figures 4, 5:
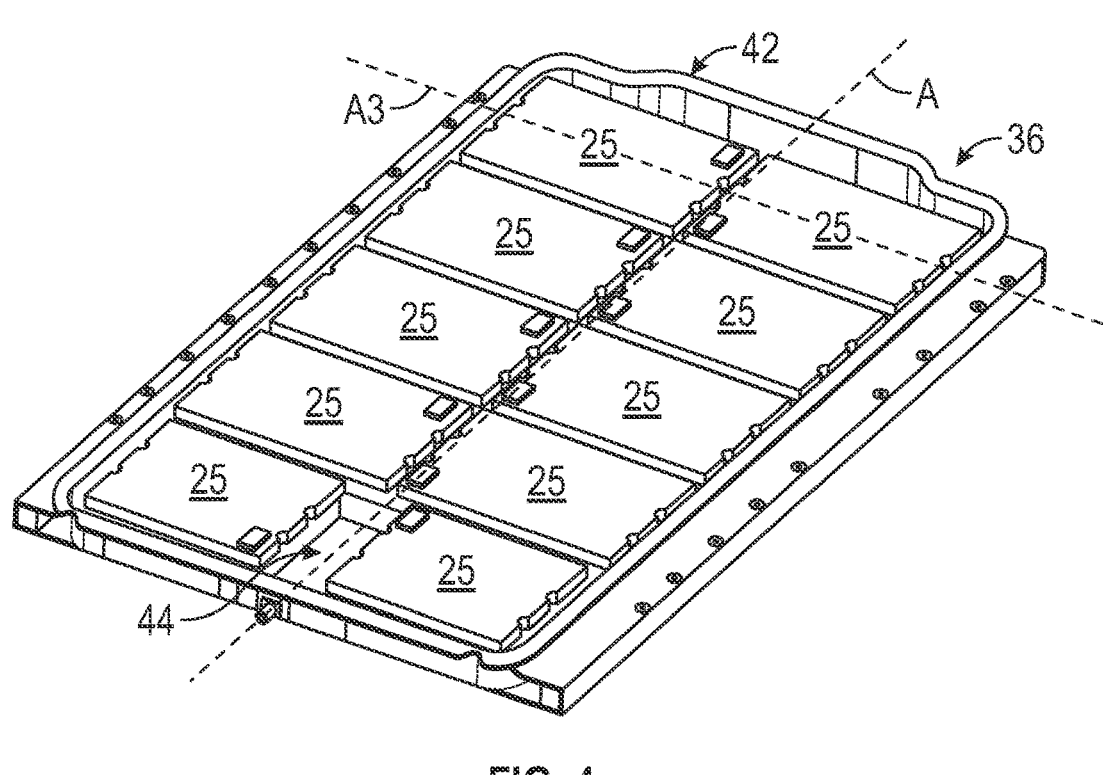
FIG. 4 illustrates the tray of FIGS. 2 and 3 with a plurality of battery arrays accommodated therein.
FIG. 5 is an isometric view of a first subassembly of the tray of FIGS. 2-3.

FIGS. 2, 3, and 4 illustrate an exemplary tray 36 for an outer enclosure assembly of a traction battery pack. For example, the tray 36 could be part of the outer enclosure assembly 34 of the traction battery pack 24 of FIG. 1.

The tray 36 may include at least a first subassembly 42 and a second subassembly 44. The second subassembly 44 may be positioned within and secured to (e.g., bolted, welded, etc.) the first subassembly 42 to establish the tray 36. Although shown as including two subassemblies, the tray 36 could include two or more subassemblies. For example, the tray 36 could include a third subassembly for establishing a multi-tiered design.

Once constructed, the tray 36 may provide a plurality of separated interior regions 46 that are each sized for accommodating one or more battery internal components, such as battery arrays 25, for example (see FIG. 4). The total number of battery arrays 25 that may be accommodated within the tray 36 could vary per design and is thus not intended to limit this disclosure.

The first subassembly 42 of the tray 36 may include a plurality of subcomponents that are primarily constructed from a first material M1. The second subassembly 44 of the tray 36 may include a plurality of subcomponents that are primarily constructed from a second material M2 that is a different material than the first material M1. The tray 36 may therefore be described as having a mixed material or "hybrid" design. The selective use of different materials within key components of the tray 36 may reduce manufacturing expenses and provide a more space efficient traction battery pack design.

In an embodiment, the first material M1 is steel and the second material M2 is aluminum. However, other combinations of materials could be utilized to provide a mixed material tray design within the scope of this disclosure.

Figure 6:
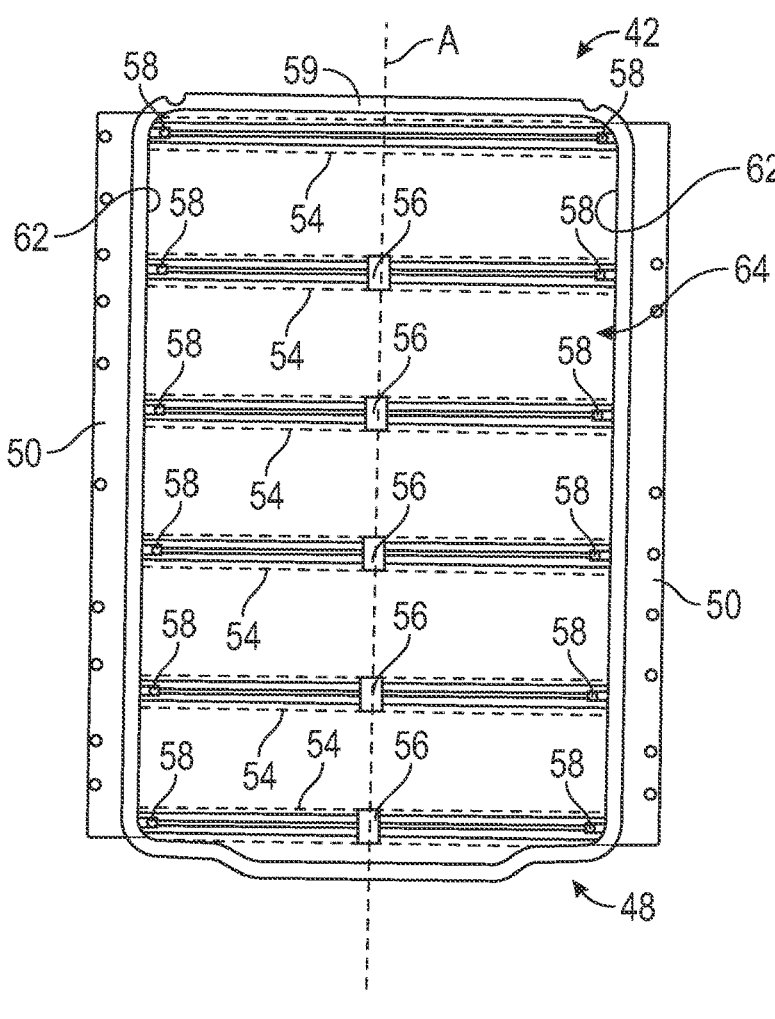
FIG. 6 is a top view of the first subassembly of FIG. 5.

FIGS. 5 and 6, with continued reference to FIGS. 1-4, illustrate further details associated with the first subassembly 42 of the tray 36. The first subassembly 42 may include a tub 48, a pair of side rails 50, a pair of doubler plates 52, one or more cross rails 54, one or more center support brackets 56, and one or more bulkheads 58. Each of these subcomponents of the first subassembly 42 may be made out of the first material M1 (e.g., steel).

The tub 48 may include a floor 60 and a front wall 59, a rear wall 61, and side walls 62 that protrude upwardly from the floor 60. Together, the floor 60 and the front wall 59, the rear wall 61, and the side walls 62 may establish an open space 64 that is sized for accommodating the second subassembly 44 of the tray 36.

In an embodiment, the tub 48 is an elongated, rectangular structure that extends along a longitudinal centerline axis A. However, other shapes are contemplated within the scope of this disclosure. The side walls 62 of the tub 48 may extend along axes that are parallel to the longitudinal centerline axis A, and the front wall 59 and the rear wall 61 may extend along axes that are transverse to the longitudinal centerline axis A.

When the tray 36 is mounted to the electrified vehicle 12, the side walls 62 of the tub 48 may extend in a lengthwise direction of the electrified vehicle 12, and the front wall 59 and the rear wall 61 may extend in a cross-vehicle direction of the electrified vehicle 12. Moreover, the front wall 59 may face toward a front end of the electrified vehicle 12, and the rear wall 61 may face toward a rear end of the electrified vehicle 12.

In an embodiment, the tub 48 is a stamped subcomponent of the first subassembly 42. However, other manufacturing techniques could be utilized to construct the tub 48 within the scope of this disclosure.

One side rail 50 may be secured to each side wall 62 of the tub 48. The side rails 50 may structurally reinforce the tub 48 and may facilitate mounting of the tray 36 relative to a vehicle body structure.

In an embodiment, the side rails 50 are roll formed subcomponents of the first subassembly 42. However, other manufacturing techniques could be utilized to construct the side rails 50 within the scope of this disclosure.

One doubler plate 52 may be secured to each of the front wall 59 and the rear wall 61 of the tub 48. The doubler plates 52 may provide mounting surfaces for attaching various coolant and electrical connectors to the tray 36.

The cross rails 54 may be mounted to a bottom surface 66 of the tub 48. The bottom surface 66 extends beneath the floor 60. The cross rails 54 may extend along axes that are transverse to the longitudinal centerline axis A. The cross rails 54 may structurally reinforce the tub 48 and tie the various subcomponents of the tub 48 together to provide a unitary, high strength part.

In an embodiment, the cross rails 54 are roll formed subcomponents of the first subassembly 42. However, other manufacturing techniques could be utilized to construct the cross rails 54 within the scope of this disclosure.

The center support brackets 56 may be mounted to the floor 60 of the tub 48. In an embodiment, the center support brackets 56 are mounted near a mid-span location of the tub 48 and are thus bisected by the longitudinal centerline axis A. As further explained below, the center support brackets 56 may be part of a central joint strategy for mounting the second subassembly 44 to the first subassembly 42 near the mid-span of the tub 48.

One or more of the bulkheads 58 may be mounted to each of the side walls 62 of the tub 48. The bulkheads 58 could additionally be mounted to the floor 60 of the tub 48. As further explained below, the bulkheads 58 may be part of a perimeter joint strategy for mounting the second subassembly 44 to the first subassembly 42.

Figure 7:
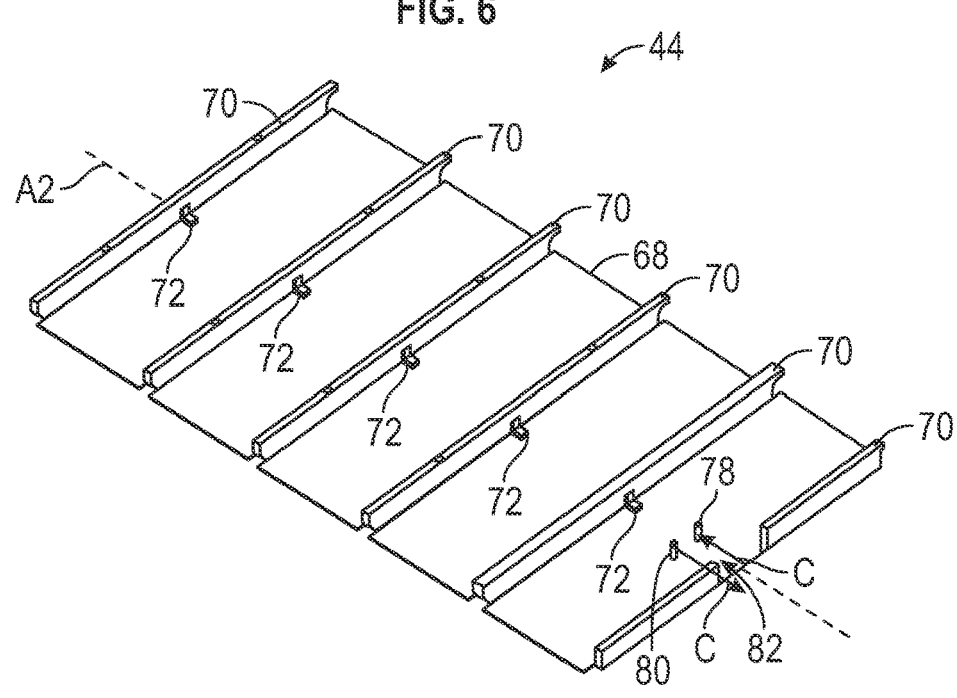
FIG. 7 is an isometric view of a second subassembly of the tray of FIGS. 2-3.
Figure 8:
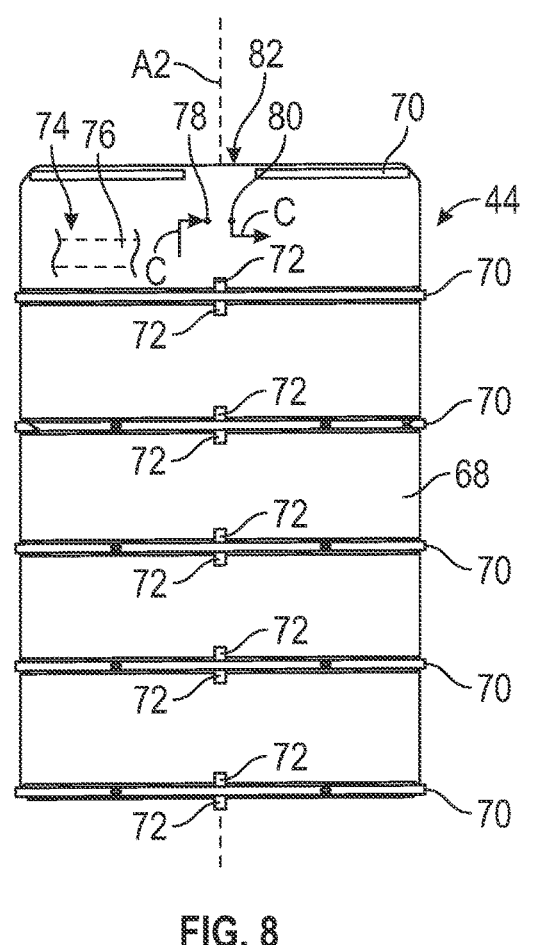
FIG. 8 is as a top view of the second subassembly of FIG. 7.

FIGS. 7 and 8, with continued reference to FIGS. 1-6, illustrate further details associated with the second subassembly 44 of the tray 36. The second subassembly 44 may include a heat exchanger plate 68, one or more cross members 70, and a plurality of mounting brackets 72. Each of these subcomponents of the second subassembly 44 may be made out of the second material M2 (e.g., aluminum).

The heat exchanger plate 68 may sometimes be referred to as a cold plate. In an embodiment, the heat exchanger plate 68 is a roll formed subcomponent of the second subassembly 44. However, other manufacturing techniques could be utilized to construct the heat exchanger plate 68 within the scope of this disclosure.

The heat exchanger plate 68 may be part of a liquid cooling system that is associated with the traction battery pack 24 and is configured for thermally managing the battery cells 32 of each battery array 25. For example, heat may be generated and released by the battery cells 32 during charging operations, discharging operations, extreme ambient conditions, or other conditions. It may be desirable to dissipate the heat from the traction battery pack 24 to enhance capacity, life, and performance of the battery cells 32. The heat exchanger plate 68 may thus be configured to conduct the heat out of the battery arrays 25. For example, the heat exchanger plate 68 may function as a heat sink for removing heat from the heat sources (e.g., the battery cells). The heat exchanger plate 68 could alternatively be employed to heat the battery arrays 25, such as during extremely cold ambient conditions, for example.

An internal cooling circuit 74 may be formed inside the heat exchanger plate 68. The internal coolant circuit 74 may include one or more interconnected coolant channels 76. The coolant channels 76 may establish a meandering path of the internal coolant circuit 74.

A coolant C may be selectively circulated through the coolant channels 76 of the internal coolant circuit 74 to thermally condition the battery internal components of the traction battery pack 24. The coolant C may enter the internal coolant circuit 74 through an inlet 78 and may exit from the internal coolant circuit 74 through an outlet 80. The inlet 78 and the outlet 80 may be in fluid communication with a coolant source (not shown). The coolant source could be part of a main cooling system of the electrified vehicle 12 or could be a dedicated coolant source of the traction battery pack 24. Although not shown, the coolant C may pass through a heat exchanger before entering the inlet 78.

In an embodiment, the coolant C is a conventional type of coolant mixture, such as water mixed with ethylene glycol. However, other coolants, including gases, are also contemplated within the scope of this disclosure.

In use, heat from the battery internal components may be conducted into the heat exchanger plate 68 and then into the coolant C as the coolant C is communicated through the internal coolant circuit 74. The heat may therefore be carried away from the battery internal components by the coolant C, thereby effectively thermally managing the battery internal components.

The cross members 70 of the second subassembly 44 may be mounted to the heat exchanger plate 68 (e.g., via the mounting brackets 72) in a spaced apart fashion. In an embodiment, two or more mounting brackets 72 are used to mount each cross member 70 to the heat exchanger plate 68. The cross members 70 may extend along axes that are transverse to a longitudinal centerline axis A2 of the heat exchanger plate 68. At least one of the cross members 70, here the member located at one of the ends of the heat exchanger plate 68, may provide a cut-out 82. The cut-out 82 may accommodate wiring, coolant lines, etc. for simplifying assembly.

In an embodiment, the cross members 70 are extruded subcomponents of the second subassembly 44. However, other manufacturing techniques could be utilized to construct the cross members 70 within the scope of this disclosure.

Once the second subassembly 44 is received within the tub 48 of the first subassembly 42, the cross members 70 may divide the open space 64 into multiple sections, thereby establishing the separated interior regions 46 that are sized for accommodating one or more battery internal components, such as battery arrays 25, for example (see FIG. 4). In an embodiment, the battery arrays 25 extend along axes A3 that are transverse to the longitudinal centerline axis A of the tub 48 when positioned within the separated interior regions 46. Some of the battery arrays 25 could be sized different from other battery arrays 25 housed within the tray 36.

Figure 9:
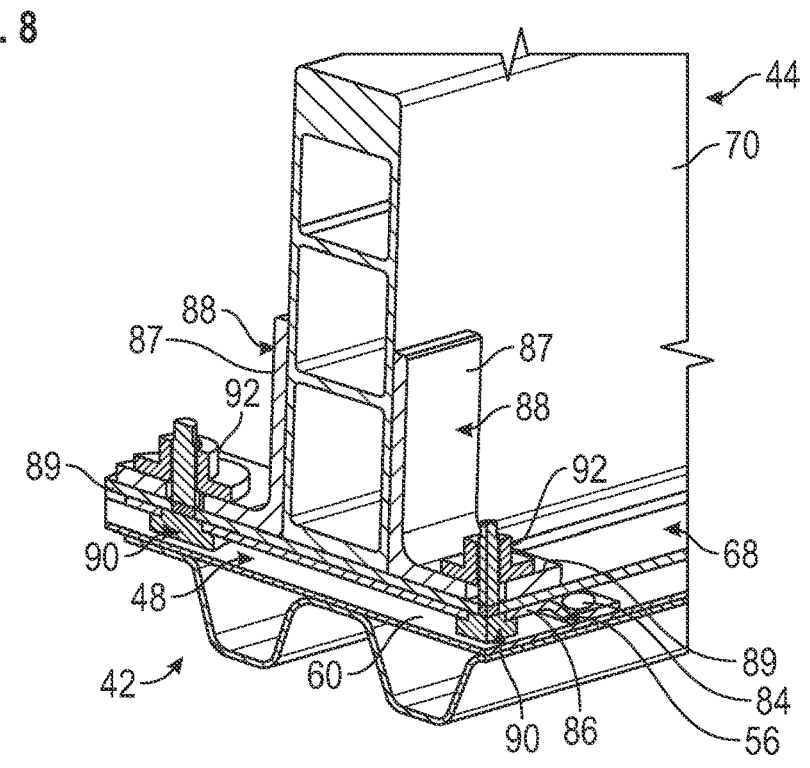
FIG. 9 illustrates a central joint strategy for connecting the second subassembly of FIGS. 7-8 to the first subassembly of FIGS. 5-6.

FIG. 9, with continued reference to FIGS. 1-8, illustrates a central joint strategy for connecting the second subassembly 44 to the first subassembly 42 to form the tray 36. As noted above, the center support brackets 56 may be utilized as part of the central joint strategy for adjoining the second subassembly 44 to the first subassembly 42 near the mid-span location of the tub 48.

Each center support bracket 56 may be secured to the floor 60 of the tub 48. In an embodiment, one or more spot welds 84 can secure the center support brackets 56 to the floor 60. However, other mechanical fastening techniques could alternatively or additionally be used.

The heat exchanger plate 68 of the second subassembly 44 may be received against a platform portion 86 of the center support brackets 56. The center support brackets 56 may therefore be configured to elevate the heat exchanger plate 68 slightly above the floor 60.

L-brackets 88 may be located above the platform portion 86 and may be positioned to flank the cross members 70 of the second subassembly 44. A first surface 87 of each L-bracket 88 may contact the cross member 70, and a second surface 89 of each L-bracket 88 may contact the heat exchanger plate 68. A fastener 90 (e.g., an M6 clinch bolt) may be inserted through the center support bracket 56, the heat exchanger plate 68, and the second surface 89 of the L-bracket 88 for mounting the second subassembly 44 to the first subassembly 42. Each fastener 90 may be secured in place by a nut 92 (e.g., an M6 nut) to complete the central joint strategy.

Figure 10:
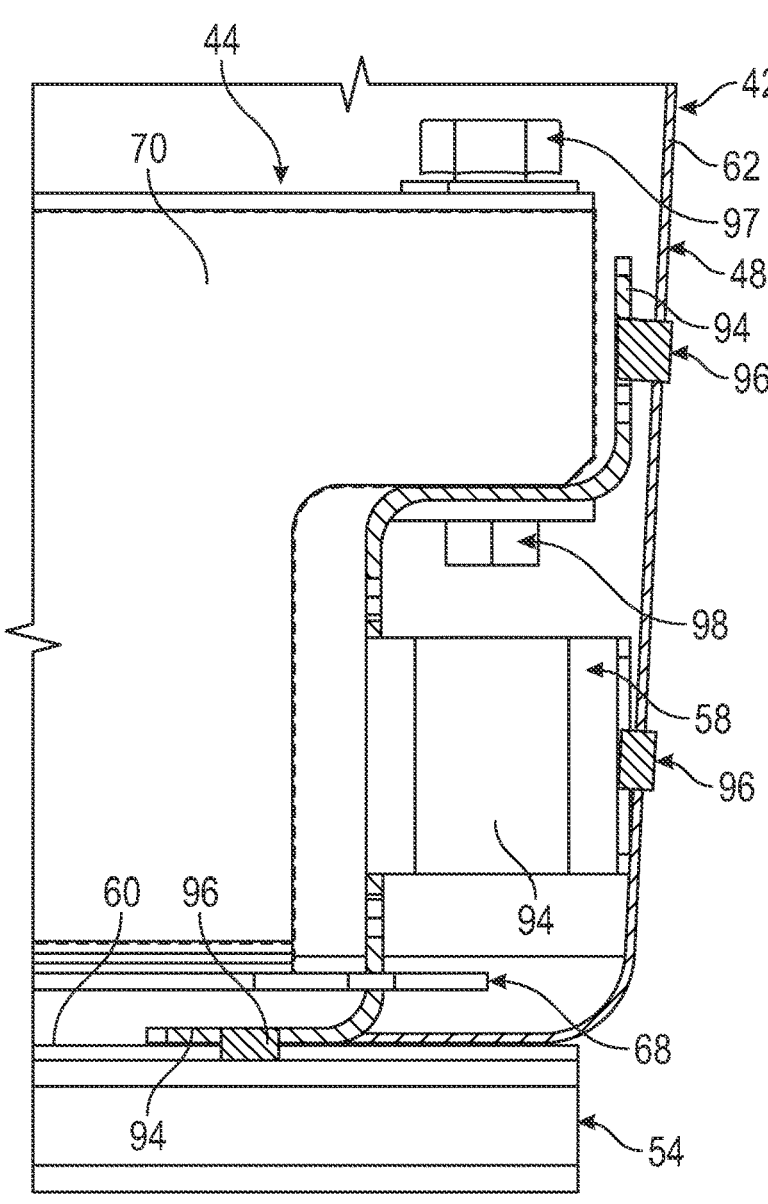
FIG. 10 illustrates a perimeter joint strategy for connecting the second subassembly of FIGS. 7-8 to the first subassembly of FIG. 5-6.

FIG. 10, with continued reference to FIGS. 1-8, illustrates a perimeter joint strategy for connecting the second subassembly 44 to the first subassembly 42 to form the tray 36. As noted above, the bulkheads 58 may be utilized as part of the perimeter joint strategy for adjoining the second subassembly 44 to the first subassembly 42 at the side walls 62 of the tub 48.

Each bulkhead 58 may be secured to one side wall 62 and to the floor 60 of the tub 48. Each bulkhead 58 may include a plurality of mounting arms 94 for mounting the bulkhead 58 in place. At least one mounting arm 94 may contact the side wall 62 for attachment, and at least one mounting arm 94 may extend under the heat exchanger plate 68 and contact the floor 60 for attachment. In an embodiment, spot welds 96 secure the bullheads 58 to the side wall 62 and the floor 60. However, other mechanical fastening techniques could alternatively or additionally be used.

A fastener 97 (e.g., an M6 bolt) may be inserted through the cross member 70 for mounting each cross member 70 relative to the bulkhead 58. The bulkhead 58 may include a weld nut 98 for receiving the fastener 97 to complete the perimeter joint strategy.

Figure 11:
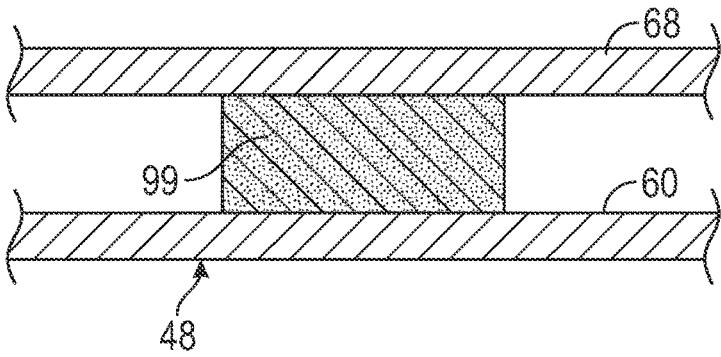
FIG. 11 illustrates an intermediate support strategy for supporting a heat exchanger plate relative to a tub of a tray structure.

FIG. 11, with continued reference to FIGS. 1-10, illustrates an intermediate support strategy for supporting the heat exchange plate 68 above the floor 60 of the tub 48 at a location(s) between the center support brackets 65 and the bulkheads 58. In order to reduce or prevent sag within the heat exchanger plate 68, one or more foam supports 99 may be positioned between the floor 60 and the heat exchange plate 68.

Figure 12:
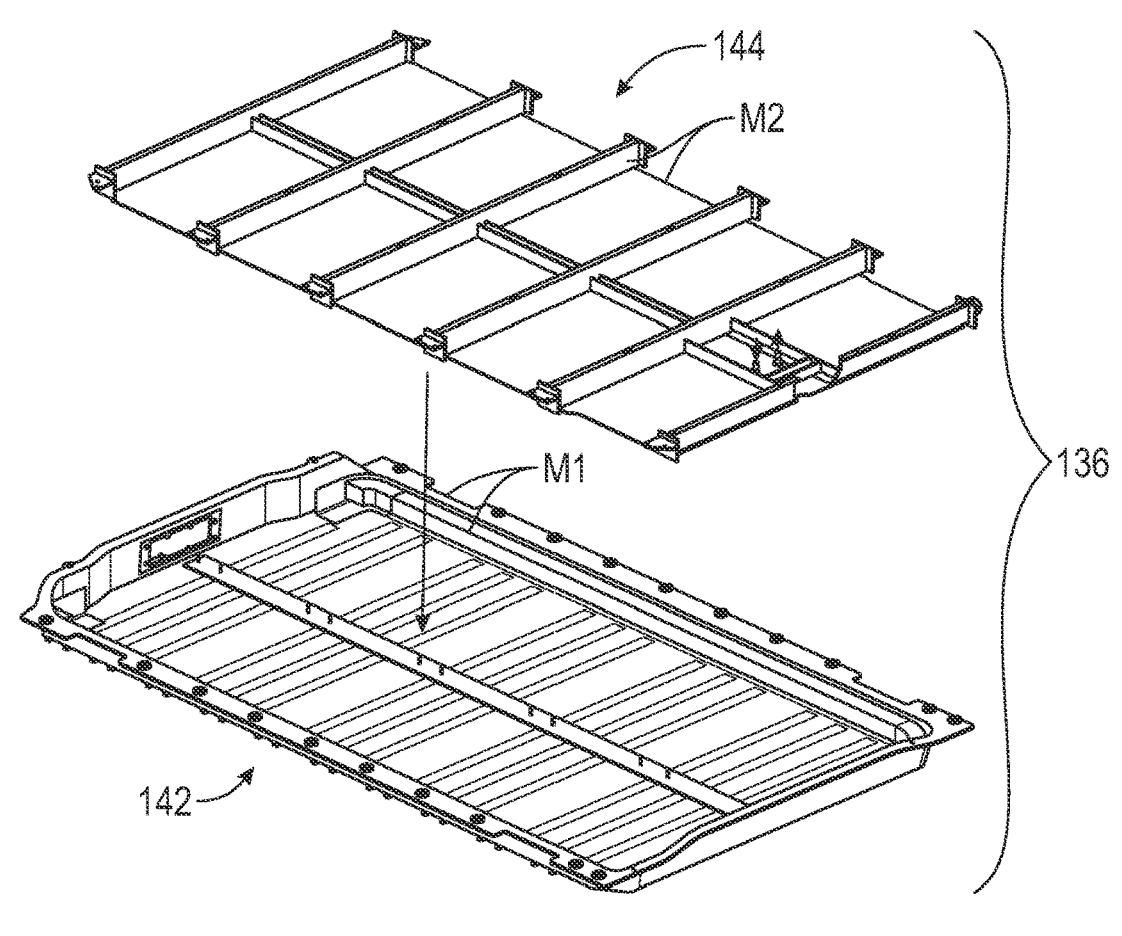
FIG. 12 is an exploded view of another exemplary tray for an outer enclosure assembly of a traction battery pack.

FIG. 12 illustrates another exemplary tray 136 for use within an outer enclosure assembly of a traction battery pack. The tray 136 is similar to the tray 36 discussed above. However, among other differences, the tray 136 may employ slightly modified central and perimeter joint strategies.

The tray 136 may include a first subassembly 142 and a second subassembly 144. The second subassembly 144 may be positioned within and secured to (e.g., bolted, welded, etc.) the first subassembly 142 to establish the tray 136.

The first subassembly 142 of the tray 136 may include a plurality of subcomponents that are primarily constructed from a first material M1. The second subassembly 144 of the tray 136 may include a plurality of subcomponents that are primarily constructed from a second material M2 that is a different material than the first material M1. The tray 136 may therefore be described as having a mixed material or "hybrid" design. The selective use of different materials within key components of the tray 136 may reduce manufacturing expenses and provide a more space efficient traction battery pack design.

In an embodiment, the first material M1 is steel and the second material M2 is aluminum. However, other combinations of materials could be utilized to provide a mixed material tray design within the scope of this disclosure.

Figure 13:
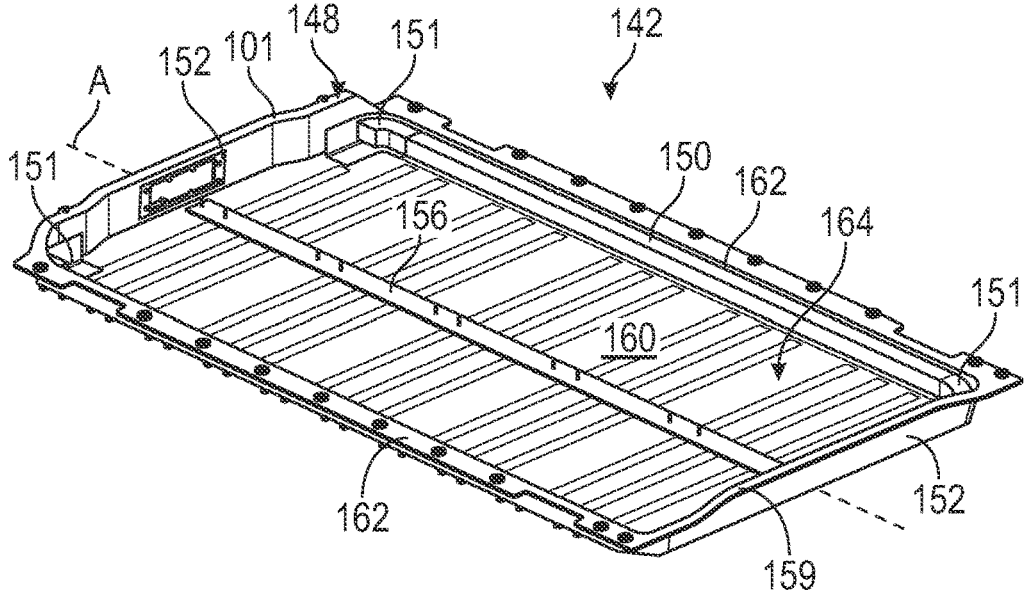
FIG. 13 is an isometric view of a first subassembly of the tray of FIG. 12.
Figure 14:
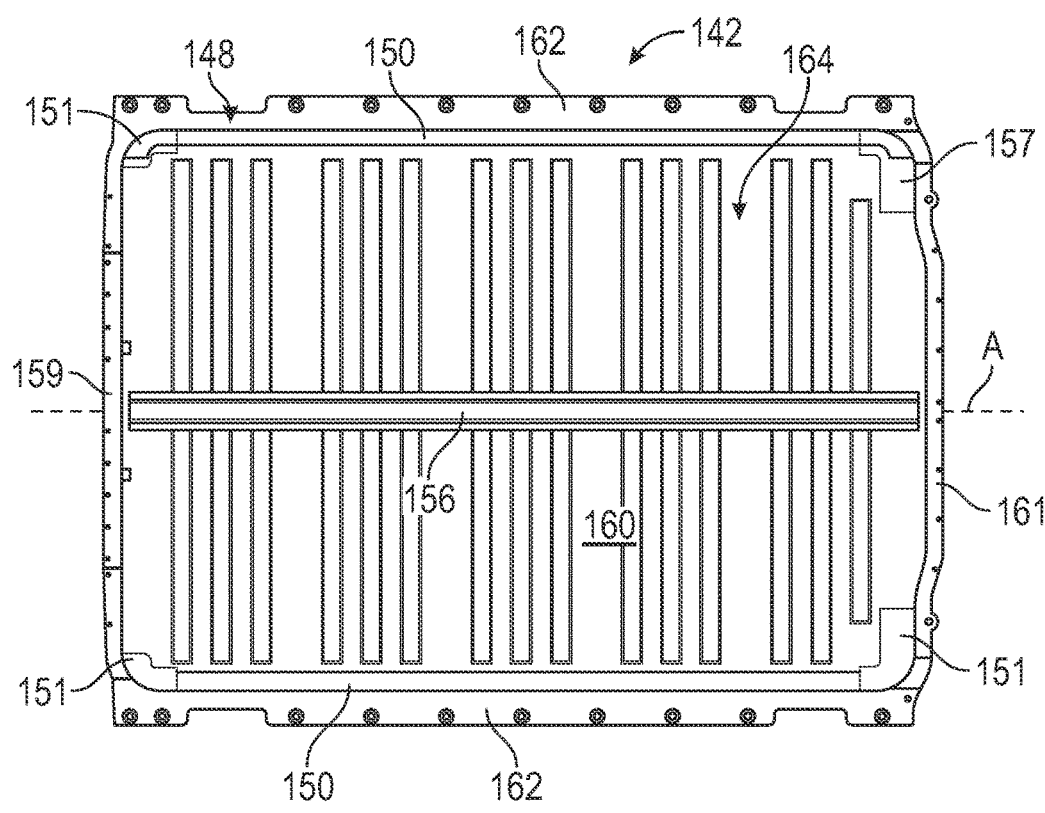
FIG. 14 is a top view of the first subassembly of FIG. 13.
Figure 15:
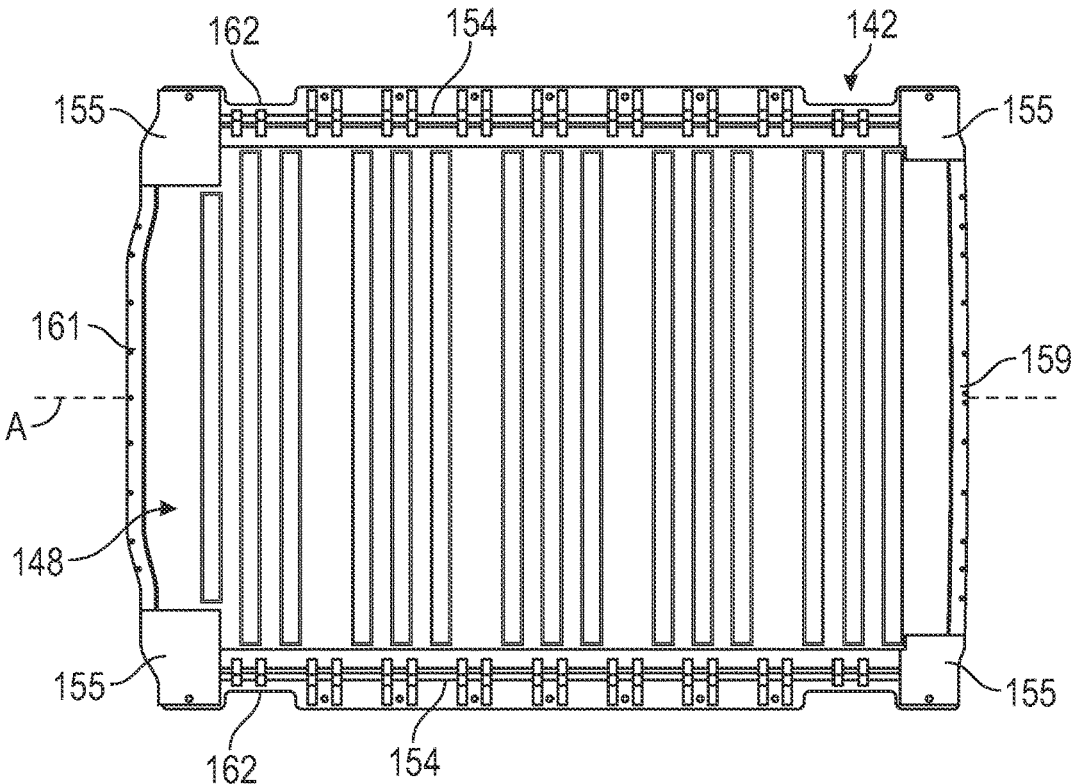
FIG. 15 is a bottom view of the first subassembly of FIG. 13.

FIGS. 13, 14, and 15, with continued reference to FIG. 12, illustrates further details associated with the first subassembly 142 of the tray 136. The first subassembly 142 may include a tub 148, a pair of inner side reinforcement rails 150, a plurality of inner side reinforcement panels 151, a pair of doubler plates 152, a pair of outer side reinforcement rails 154, a plurality of outer side reinforcement panels 155, and a center support bracket 156. Each of these subcomponents of the first subassembly 142 may be made out of the first material M1 (e.g., steel).

The tub 148 may include a floor 160 and a front wall 159, a rear wall 161, and side walls 162 that protrude upwardly from the floor 160. Together, the floor 160 and the front wall 159, the rear wall 161, and the side walls 162 may establish an open space 164 that is sized for accommodating the second subassembly 144 of the tray 136.

In an embodiment, the tub 148 is an elongated, rectangular structure that extends along a longitudinal centerline axis A. However, other shapes are contemplated within the scope of this disclosure. The side walls 162 of the tub 148 may extend along axes that are parallel to the longitudinal centerline axis A, and the front wall 159 and the rear wall 161 may extend along axes that are transverse to the longitudinal centerline axis A.

When the tray 136 is mounted to a vehicle, the side walls 162 of the tub 148 may extend in a lengthwise direction of the vehicle, and the front wall 159 and the rear wall 161 may extend in a cross-vehicle direction. Moreover, the front wall 159 may face toward a front end of the vehicle, and the rear wall 161 may face toward a rear end of the vehicle.

One inner side reinforcement rail 150 may be secured to an interior facing surface of each side wall 162 of the tub 148. Each inner side reinforcement rail 150 may connect between two inner side reinforcement panels 151, which are generally mounted within the corners of the tub 148. Each inner side reinforcement rail 150 may establish perimeter mounting surfaces for mounting the second subassembly 144 to the first subassembly 142.

One doubler plate 152 may be secured to each of the front wall 159 and the rear wall 161 of the tub 148. The doubler plates 152 may provide mounting surfaces for attaching various coolant and electrical connectors to the tray 136.

One outer side reinforcement rail 154 may be secured to an exterior facing surface of each side wall 162 of the tub 148. Each outer side reinforcement rail 154 may connect between two outer side reinforcement panels 155. The outer side reinforcement rails 154 and the outer side reinforcement panels 155 may structurally reinforce the tub 148.

The center support bracket 156 may be mounted to the floor 160 of the tub 148. In an embodiment, the center support bracket 156 is mounted near a mid-span location of the tub 148 and is thus bisected by the longitudinal centerline axis A. The center support bracket 156 may extend along a majority of a length of the tub 148. The center support bracket 156 may establish central mounting surfaces for mounting (e.g., bolting, welding, or both) the second subassembly 144 to the first subassembly 142 near the mid-span of the tub 148.

Figures 16, 17:
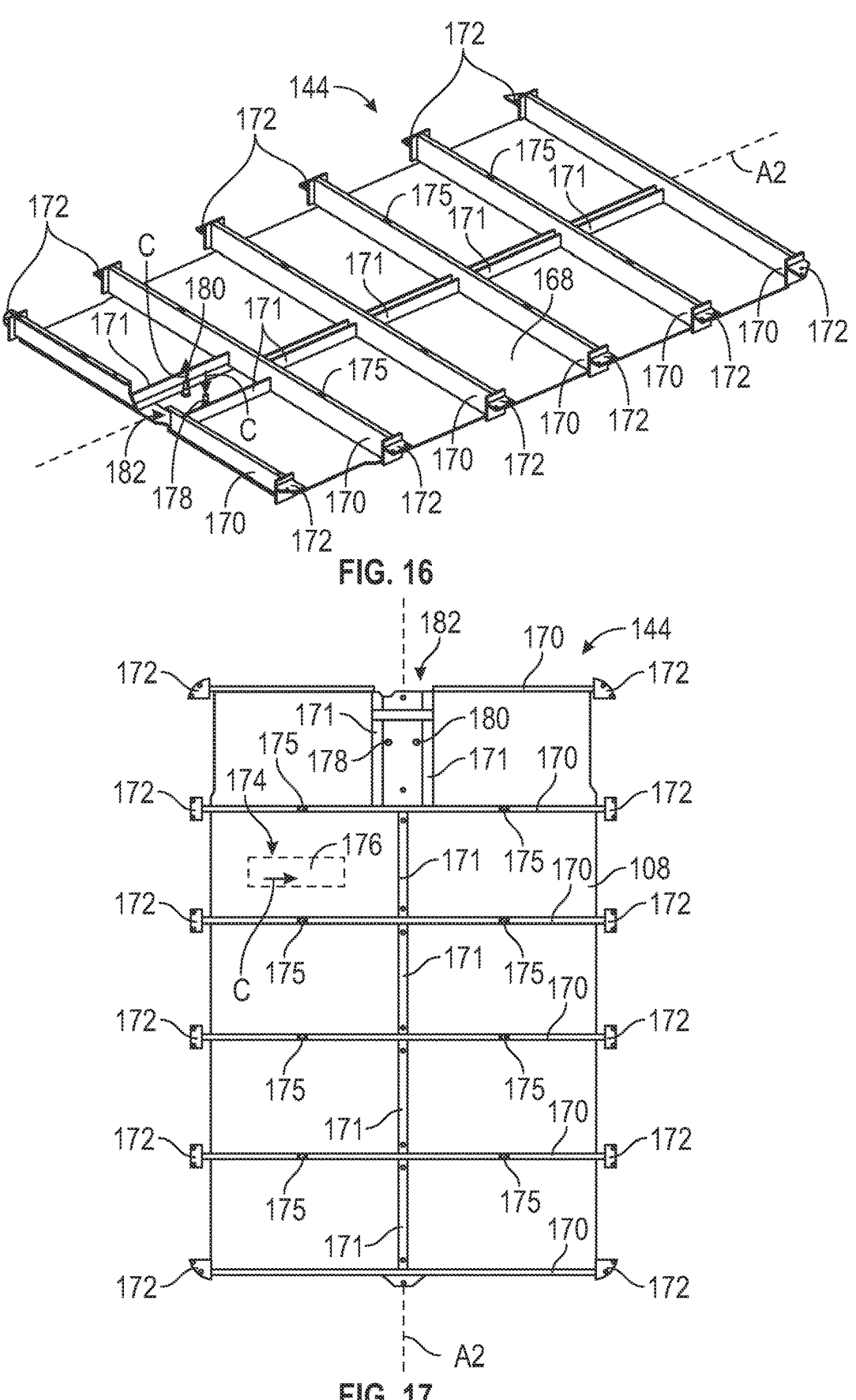
FIG. 16 is an isometric view of a second subassembly of the tray of FIG. 12.
FIG. 17 is a top view of the second subassembly of FIG. 16.

FIGS. 16-17, with continued reference to FIGS. 12-15, illustrate further details associated with the second subassembly 144 of the tray 136. The second subassembly 144 may include a heat exchanger plate 168, one or more cross members 170, a plurality of longitudinal supports 171, and a plurality of mounting brackets 172. Each of these subcomponents of the second subassembly 144 may be made out of the second material M2 (e.g., aluminum).

The heat exchanger plate 168 may be part of a liquid cooling system that is associated with the traction battery pack 24 and is thus configured to conduct the heat out of battery internal components. An internal cooling circuit 174 may be formed inside the heat exchanger plate 168. The internal coolant circuit 174 may include one or more interconnected coolant channels 176. The coolant channels 176 may establish a meandering path of the internal coolant circuit 174.

A coolant C may be selectively circulated through the coolant channels 176 of the internal coolant circuit 174 to thermally condition the battery internal components of the traction battery pack 24. The coolant C may enter the internal coolant circuit 174 through an inlet 178 and may exit from the internal coolant circuit 174 through an outlet 180.

In use, heat from the battery internal components may be conducted into the heat exchanger plate 168 and then into the coolant C as the coolant C is communicated through the internal coolant circuit 174. The heat may therefore be carried away from the battery internal components by the coolant C, thereby effectively thermally managing the battery internal components.

The cross members 170 of the second subassembly 144 may be mounted to the heat exchanger plate 168 in a spaced apart fashion. The cross members 170 may extend along axes that are transverse to a longitudinal centerline axis A2 of the heat exchanger plate 168. At least one of the cross members 170, here the member located at one of the longitudinal ends of the heat exchanger plate 168, may provide a cut-out 182 for accommodate wiring, coolant lines, etc. for ease of assembly.

The cross members 170 may be bolted to the heat exchanger plate 168, welded to the heat exchanger plate 168, or both. In an embodiment, a combination of fasteners 175

(e.g., M6 and M8 studs) are utilized for located and securing the cross members 170 relative to the heat exchanger plate 168.

One or more longitudinal supports 171 may be positioned to extend between adjacent cross members 170. The longitudinal supports 171 may structurally support and reinforce the spaced apart cross members 170.

One mounting bracket 172 may be secured to each end of each cross member 170. The mounting brackets 172 may be secured (e.g., bolted, welded, or both) to one of the inner side reinforcement rails 150 and/or the inner side reinforcement panels 151 of the first subassembly 142 for providing the perimeter joint strategy of the tray 136.

Figure 18:
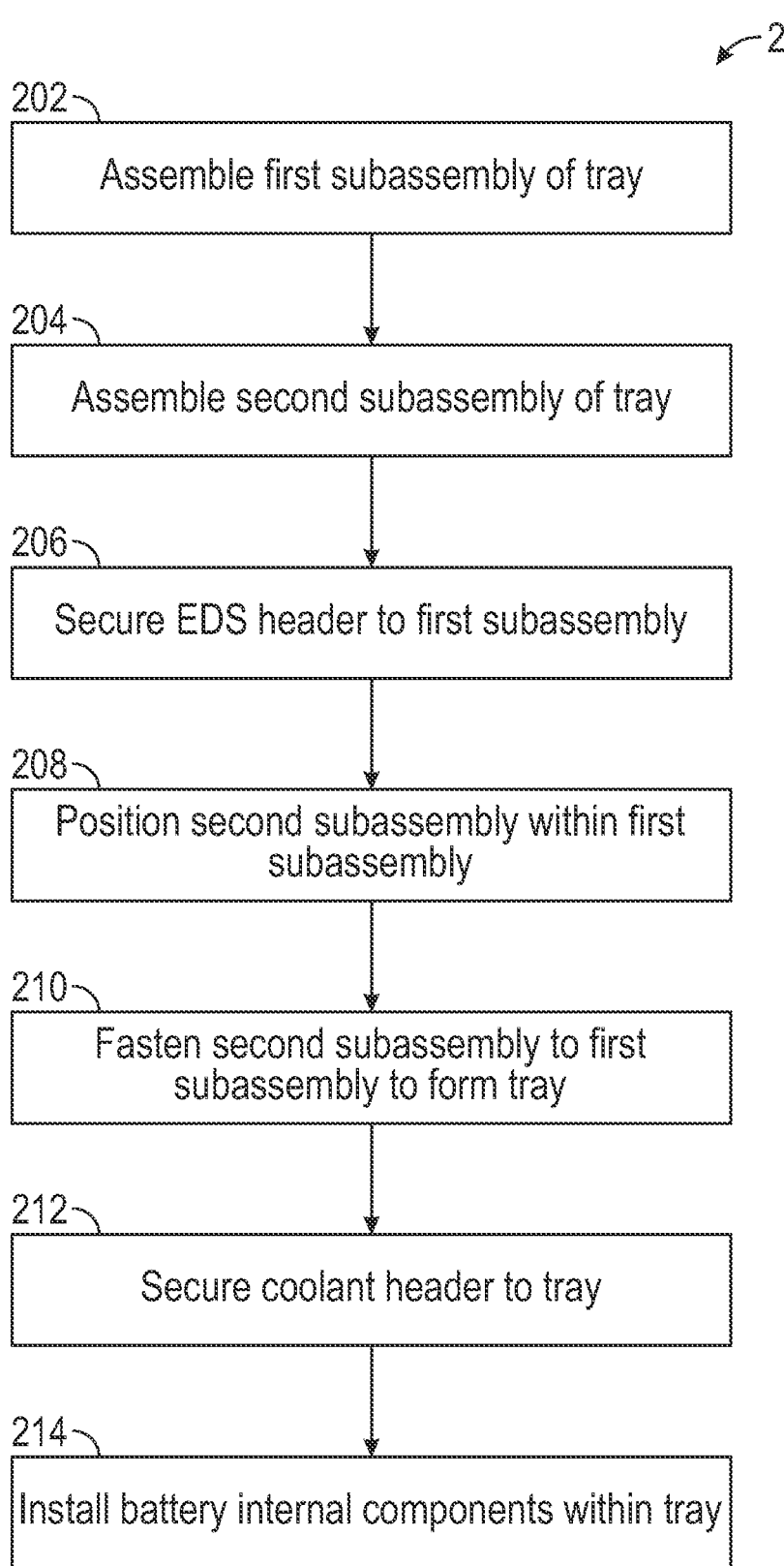
FIG. 18 schematically illustrates a method of assembling a traction battery pack.

FIG. 18 schematically illustrates a method 200 for assembling the traction battery pack 24 discussed above. The method 200 may include a greater or fewer number of steps than are highlighted herein, and the recited order of the steps is not intended to limit this disclosure.

The method 200 may include at least the following steps. First, at block 202, the first subassembly 42, 142 may be assembled. In some implementations, the first subassembly 42, 142 may be a pre-assembled part that is received in a ready-to-use manner when it arrives at the assembly facility.

Next, at block 204, the second subassembly 44, 144 may be assembled. In some implementations, the second subassembly 44, 144 may be a pre-assembled part that is received in a ready-to-use manner when it arrives at the assembly facility.

If necessary, one or more electrical distribution header may be secured to the tub 48, 148 of the first subassembly 42, 142 at block 206. The headers may be mounted to at least one of the doubler plates 52, 152, for example.

The second subassembly 44, 144 may be positioned within the open space 64, 164 of the first subassembly 42, 142 at block 208. In an embodiment, the second subassembly 44, 144 may be simply dropped into the open space 64, 164.

Next, at block 210, the second subassembly 44, 144 may be mechanically fastened to the first subassembly 42, 142 to form the tray 36, 136. This step may include employing both the center and perimeter joint strategies described herein.

A coolant header may be secured to the tub 48, 148 at block 212. The header may be mounted to at least one of the doubler plates 52, 152, for example. Finally, battery arrays 25 and other battery internal components may be installed within the tray 36, 136 at block 214.

The exemplary traction battery packs of this disclosure include tray structures having a mixed material design. The mixed material design may reduce the expenses associated with manufacturing the traction battery pack. The mixed material design may further enable the traction battery pack to be more space efficient in terms of reducing its footprint when mounted to a vehicle body structure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:

an outer enclosure assembly including a tray;

a battery array housed inside the outer enclosure assembly;

the tray including a mixed material structure comprising a first subassembly and a second subassembly that is joined to the first subassembly; and wherein the first subassembly includes a tub constructed from a first material, and the second subassembly includes a heat exchanger plate receivable within the tub, a plurality of cross members secured to the heat exchanger plate, and a plurality of mounting brackets secured to the heat exchanger plate, each of the heat exchanger plate, the plurality of cross members, and the plurality of mounting brackets being constructed of a second material that is different than the first material, wherein each of the plurality of mounting brackets is configured as a L-bracket that includes a first surface positioned in contact with one of the plurality of cross members and a second surface positioned in contact with the heat exchanger plate.

2. The traction battery pack as recited in claim 1, wherein the outer enclosure assembly includes a cover secured to the tray.

3. The traction battery pack as recited in claim 1, wherein the first material includes steel and the second material includes aluminum.

4. The traction battery pack as recited in claim 1, wherein the first subassembly further includes a pair of side rails, a pair of doubler plates, one or more cross rails, one or more center support brackets, and one or more bulkheads secured to the tub and each comprised of the first material.

5. The traction battery pack as recited in claim 1, wherein the first subassembly further includes a pair of inner side reinforcement rails, a plurality of inner side reinforcement panels, a pair of doubler plates, a pair of outer side reinforcement rails, a plurality of outer side reinforcement panels, and a center support bracket secured to the tub and each comprised of the first material.

6. The traction battery pack as recited in claim 1, wherein the heat exchanger plate includes an inlet, an outlet, and an internal cooling circuit comprising a plurality of interconnected coolant channels.

7. The traction battery pack as recited in claim 1, wherein the heat exchanger plate is elevated above a floor of the tub by at least one center support bracket.

8. The traction battery pack as recited in claim 7, comprising a foam support situated between the floor and the heat exchanger plate.

9. The traction battery pack as recited in claim 7, wherein the at least one center support bracket establishes a center joint strategy for joining the second subassembly to the first subassembly along a longitudinal centerline axis of the tub.

10. The traction battery pack as recited in claim 1, wherein the second subassembly is secured to the first subassembly by a plurality of bulkheads that establish a perimeter joint strategy for joining the second subassembly to the first subassembly.

11. The traction battery pack as recited in claim 1, wherein a perimeter of the second subassembly is secured to an inner side reinforcement rail and an inner side reinforcement panel of the first subassembly, and further wherein the inner side reinforcement rail and the inner side reinforcement panel are secured to a side wall of the tub.

12. The traction battery pack as recited in claim 1, wherein the second subassembly is secured to the first subassembly near a mid-span of the tub by a single center support bracket of the first subassembly.

13. The traction battery pack as recited in claim 1, comprising a fastener that extends through the heat exchanger plate and the second surface of the L-bracket for mounting the second subassembly to the first subassembly.

14. The traction battery pack as recited in claim 13, wherein the fastener is secured in place at the second surface by a nut.

15. The traction battery pack as recited in claim 10, wherein each of the plurality of bulkheads includes a first mounting arm secured to a sidewall of the tub by a first spot weld, and a second mounting arm secured to a floor of the tub by a second spot weld.

16. A traction battery pack, comprising:
an outer enclosure assembly including a mixed material tray structure having a first subassembly and a second subassembly that is joined to the first subassembly;
the first subassembly includes a tub and a support bracket secured to a floor of the tub, each of the tub and the support bracket being constructed from a first material;
the second subassembly includes a heat exchanger plate elevated above the floor of the tub by the support bracket, a cross member secured to the heat exchanger plate, and an L-bracket positioned to contact both the heat exchanger plate and the cross member, each of the heat exchanger plate, the cross member, and the L-bracket being constructed of a second material that is different from the first material; and
a fastener received through the support bracket, the heat exchanger plate, and then through the L-bracket for joining the second subassembly to the first subassembly.

17. The traction battery pack as recited in claim 16, wherein the L-bracket includes a first surface that contacts the cross member and a second surface that contacts the heat exchanger plate, and further wherein the fastener is secured in place at the second surface by a nut.

18. A traction battery pack, comprising:
an outer enclosure assembly including a mixed material tray structure having a first subassembly and a second subassembly that is joined to the first subassembly;
the first subassembly includes a tub and a bulkhead secured to the tub, each of the tub and the bulkhead being constructed from a first material;
the second subassembly includes a heat exchanger plate received within the tub and a cross member secured to the heat exchanger plate, each of the heat exchanger plate and the cross member being constructed of a second material that is different from the first material;
a first spot weld that secures a first mounting arm of the bulkhead to a side wall of the tub; and
a second spot weld that secures a second mounting arm of the bulkhead to a floor of the tub.

19. The traction battery pack as recited in claim 18, comprising a fastener received through the cross member and into the bulkhead for mounting the cross member to the bulkhead.

* * * * *